United States Patent
Xu (10) Patent No.: US 12,045,554 B2
(45) Date of Patent: Jul. 23, 2024

(54) CIRCUIT SIMULATION METHOD AND DEVICE

(71) Applicant: CHANGXIN MEMORY TECHNOLOGIES, INC., Hefei (CN)

(72) Inventor: Fan Xu, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 347 days.

(21) Appl. No.: 17/457,815

(22) Filed: Dec. 6, 2021

(65) Prior Publication Data

US 2022/0327273 A1    Oct. 13, 2022

Related U.S. Application Data

(63) Continuation of application No. PCT/CN2021/108816, filed on Jul. 28, 2021.

(30) Foreign Application Priority Data

Apr. 7, 2021   (CN) .......................... 202110372941.8

(51) Int. Cl.
   *G06F 30/392*   (2020.01)
   *G06F 30/36*    (2020.01)
   *G06F 30/394*   (2020.01)

(52) U.S. Cl.
   CPC ............ *G06F 30/392* (2020.01); *G06F 30/36* (2020.01); *G06F 30/394* (2020.01)

(58) Field of Classification Search
   CPC .. G06F 30/392; G06F 30/394; G06F 2119/12; G06F 30/39; G06F 30/398;
   (Continued)

(56) References Cited

U.S. PATENT DOCUMENTS 9,881,119 B1 *  1/2018  Kukal .................. G06F 30/367
10,289,793 B1 *  5/2019  Kukal .................. G06F 30/394
(Continued)

FOREIGN PATENT DOCUMENTS

CN    102339341 B    7/2013
CN    110895648 A    3/2020
(Continued)

OTHER PUBLICATIONS

International Search Report cited in PCT/CN2021/108816, mailed Dec. 20, 2021, 10 pages.

*Primary Examiner* — Binh C Tat
(74) *Attorney, Agent, or Firm* — Kilpatrick Townsend & Stockton LLP (57) ABSTRACT

Embodiments of the present application provide a circuit simulation method and a device. The method includes: determining a top-layer structure and a minimum circuit cell layer of a circuit schematics; determining, in a circuit layout, an area and a relative distribution location of each target circuit cell in the minimum circuit cell layer; generating a first circuit structure based on the top-layer structure, each target circuit cell, and the area and the relative distribution location of each target circuit cell in the circuit layout; and adding a parasitic effect circuit to the first circuit structure, generating a target circuit structure corresponding to the circuit schematics, and performing simulation based on the target circuit structure.

18 Claims, 5 Drawing Sheets

(58) Field of Classification Search
CPC ............... G06F 2111/12; G06F 30/327; G06F 2119/06; G06F 2119/18; G06F 30/36; G06F 30/367; G06F 30/337; G06F 1/10; G06F 30/396; G06F 30/3308; G06F 2119/02; G06F 30/3953; G06F 30/3947; G06F 2115/06; G06F 30/3315; G06F 1/06; G06F 2111/04; G06F 2111/20; G06F 2119/10; G06F 30/30; G06F 30/333; G06F 2111/10; G06F 2119/08; G06F 21/73; G06F 21/79; G06F 2115/02; G06F 30/33; G06F 30/3323; G06F 2113/18; G06F 3/0604; G06F 3/0659; G06F 3/0679; H01L 23/5386; H01L 2224/73267; H01L 2224/49176; H01L 2924/15311; H01L 23/5389; H01L 21/82; H01L 2224/48227; G03F 1/36; G03F 1/68; G03F 1/78

USPC .................................................. 716/100–106
See application file for complete search history.

(56) References Cited

U.S. PATENT DOCUMENTS

| | | | |
|---|---|---|---|
| 10,878,166 | B1 | 12/2020 | Wang et al. |
| 11,188,700 | B2 | 11/2021 | Zhang et al. |
| 2019/0211475 | A1* | 7/2019 | Ito .................. C12N 5/0606 |

FOREIGN PATENT DOCUMENTS

| | | |
|---|---|---|
| CN | 111008514 A | 4/2020 |
| CN | 112149379 A | 12/2020 |
| CN | 112966465 A | 6/2021 |

* cited by examiner

FIG. 8

CIRCUIT SIMULATION METHOD AND DEVICE

CROSS-REFERENCE TO RELATED APPLICATIONS

This is a continuation of International Application No. PCT/CN2021/108816, filed on Jul. 28, 2021, which claims the priority to Chinese Patent Application No. 202110372941.8, titled "CIRCUIT SIMULATION METHOD AND DEVICE" and filed with the China National Intellectual Property Administration (CNIPA) on Apr. 7, 2021. The entire contents of International Application No. PCT/CN2021/108816 and Chinese Patent Application No. 202110372941.8 are incorporated herein by reference.

TECHNICAL FIELD

Embodiments of the present application relate to the technical field of integrated circuits (ICs), and in particular, to a circuit simulation method and a device.

BACKGROUND

Before being designed, a circuit layout requires pre-layout simulation based on an existing circuit schematics, to determine whether a circuit schematics design meets a standard.

As an integrated circuit process node continues to shrink, a parasitic effect in a circuit design not only affects signal integrity and reliability of an integrated circuit, but also has a certain impact on signal timing, noise, power consumption, and the like. At a conventional pre-layout simulation stage, an impact of a subsequent metal wiring parasitic element is not considered, or a parasitic effect representation model added is not sufficiently accurate, resulting in a relatively large difference between a result of the pre-layout simulation stage and actual chip measurement data, affecting pre-layout simulation accuracy of a circuit.

SUMMARY

According to a first aspect, an embodiment of the present application provides a circuit simulation method, including:
  determining a top-layer structure and a minimum circuit cell layer of a circuit schematics, wherein the minimum circuit cell layer includes at least one target circuit cell;
  determining, in a circuit layout, an area of each of the target circuit cells in the minimum circuit cell layer, and determining, in the circuit layout, a relative distribution location of each of the target circuit cells;
  generating a first circuit structure based on the top-layer structure, each of the target circuit cells, and the area and the relative distribution location of each of the target circuit cells in the circuit layout; and
  adding a parasitic effect circuit to the first circuit structure, generating a target circuit structure corresponding to the circuit schematics, and performing simulation based on the target circuit structure.

According to a second aspect, an embodiment of the present application provides a circuit simulation apparatus, including at least one processor and a memory, wherein the memory stores computer executable instructions; and the at least one processor executes the computer executable instructions stored in the memory, such that the at least one processor performs:
  determining a top-layer structure and a minimum circuit cell layer of a circuit schematics, wherein the minimum circuit cell layer includes at least one target circuit cell;
  determining, in a circuit layout, an area of each of the target circuit cells in the minimum circuit cell layer, and determining, in the circuit layout, a relative distribution location of each of the target circuit cells;
  generating a first circuit structure based on the top-layer structure, each of the target circuit cells, and the area and the relative distribution location of each of the target circuit cells in the circuit layout; and
  adding a parasitic effect circuit to the first circuit structure, generating a target circuit structure corresponding to the circuit schematics, and performing simulation based on the target circuit structure.

According to a third aspect, an embodiment of the present application provides a computer readable storage medium, wherein the computer readable storage medium stores computer executable instructions, and when executing the computer executable instructions, a processor implements the circuit simulation method according to the first aspect.

According to a fourth aspect, an embodiment of the present application provides a computer program product, including a computer program, wherein when executed by a processor, the computer program implements the circuit simulation method according to the first aspect.

BRIEF DESCRIPTION OF THE DRAWINGS

To describe the technical solutions in the embodiments of the present application or in the prior art more clearly, the following briefly describes the accompanying drawings required for describing the embodiments of the present application or the prior art. Apparently, the accompanying drawings in the following description show some embodiments of the present application, and those of ordinary skill in the art may still derive other drawings from these accompanying drawings without creative efforts.

DETAILED DESCRIPTION

In order to make the objectives, technical solutions and advantages of the embodiments of the present application clearer, the following clearly and completely describes the technical solutions in the embodiments of the present application with reference to the accompanying drawings in the embodiments of the present application. Apparently, the described embodiments are some rather than all of the embodiments of the present application. All other embodiments obtained by those of ordinary skill in the art based on the embodiments of the present disclosure without creative efforts should fall within the protection scope of the present disclosure. In addition, although disclosures in the present application are presented according to one or several exemplary examples, it should be understood that each aspect of these disclosures can also individually constitute a complete implementation. It should be noted that brief descriptions of the terms in the present application are used only to facilitate the understanding of the implementations described below, and are not intended to limit the implementations of the present application. Unless otherwise stated, these terms should be understood according to their ordinary and usual meanings.

In this specification, the claims, and the accompanying drawings of the present application, the terms "first", "second", and so on are intended to distinguish similar or like objects or entities but do not necessarily indicate a specific order or sequence, unless otherwise noted. It should be understood that the terms used in such a way are interchangeable in proper circumstances, for example, can enable implementation in other sequences than those illustrated or described in the embodiments of the present application.

In addition, the terms "including" and "having" and any variations thereof are intended to cover non-exclusive inclusion. For example, for products or devices that include a series of components, the components are not necessarily limited to those clearly listed, but may include other components not clearly listed or inherent to these products or devices.

The term "module" used in the present application refers to any known or subsequently developed hardware, software, firmware, artificial intelligence, fuzzy logic, or combination of hardware or/and software code that can perform functions related to the element.

At present, in order to improve electrical properties of a chip, before being designed, a circuit layout requires pre-layout simulation based on an existing circuit schematics, to determine whether a circuit schematics design meets a standard.

At a conventional circuit pre-layout simulation stage, simulation is usually performed directly by using a circuit schematics, without considering an impact of a metal wiring parasitic element at a subsequent stage, resulting in a relatively large difference between a result of a pre-simulation stage and actual measurement data of the chip, and low simulation accuracy.

In order to resolve the foregoing technical problem, an embodiment of the present application provides a circuit simulation method. A circuit designer can accurately simulate a parasitic effect in a circuit layout and perform simulation by relying only on a circuit schematics at a pre-layout simulation stage, thereby effectively improving pre-layout simulation accuracy of a circuit. The following uses detailed embodiments for detailed description.

The circuit simulation method may be applied to various circuit pre-layout simulation stages, for example, a storage chip pre-layout simulation stage or a processor chip pre-layout simulation stage. This is not limited in this embodiment of the present application.

Figure 1:
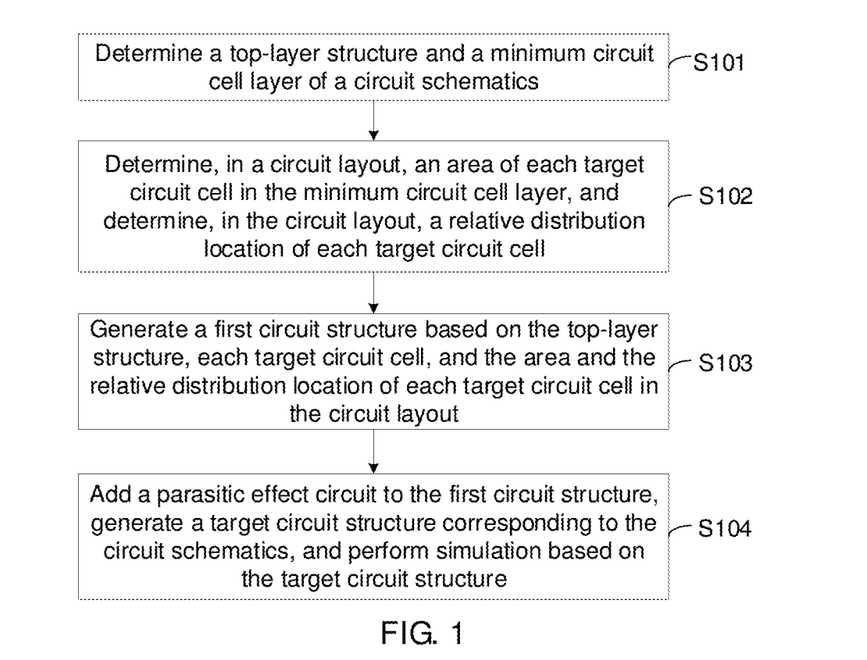
FIG. 1 is a schematic flowchart of a circuit simulation method according to an embodiment of the present application.

FIG. 1 is a schematic flowchart of a circuit simulation method according to an embodiment of the present application. In a feasible implementation, the method includes:

S101. Determine a top-layer structure and a minimum circuit cell layer of a circuit schematics.

The minimum circuit cell layer includes at least one target circuit cell. In this embodiment of the present application, when the circuit schematics includes a circuit structure of three or more layers, the circuit structure corresponding to the circuit schematics may be preprocessed, and processed into a flat circuit structure including only the top-layer structure and the minimum circuit cell layer.

Figure 2:
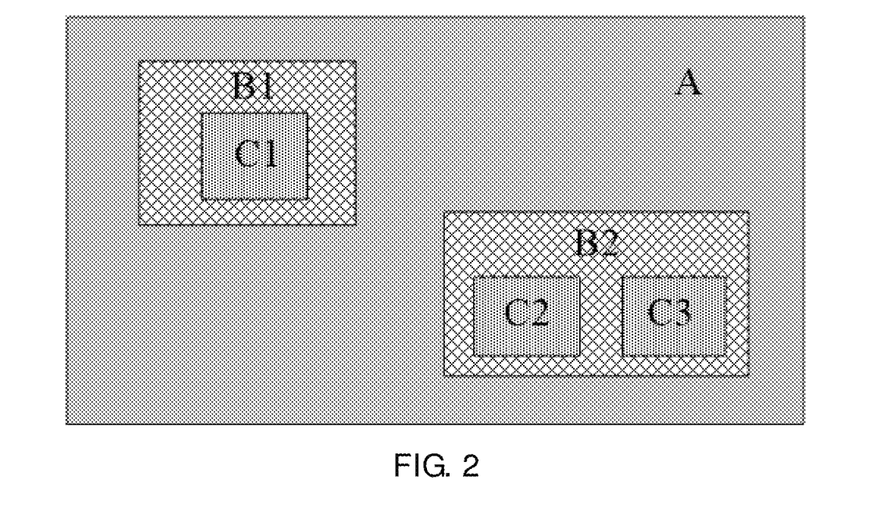
FIG. 2 is a schematic diagram of a multilayer circuit structure according to an embodiment of the present application.

For better understanding of this embodiment of the present application, refer to FIG. 2. FIG. 2 is a schematic diagram of a multilayer circuit structure according to an embodiment of the present application. In FIG. 2, a circuit schematics includes a circuit structure A, circuit structures B1 and B2, and circuit cells C1, C2, and C3. The circuit cells C1, C2, and C3 are each a minimum circuit cell in the circuit schematics.

In this embodiment of the present application, the circuit structure A may be considered as a top-layer structure of the circuit schematics, the circuit structures B1 and B2 may be considered as an intermediate layer structure of the circuit schematics, and the circuit cell C1, C2, and C3 may be considered as a minimum circuit cell layer of the circuit schematics.

Figure 3:
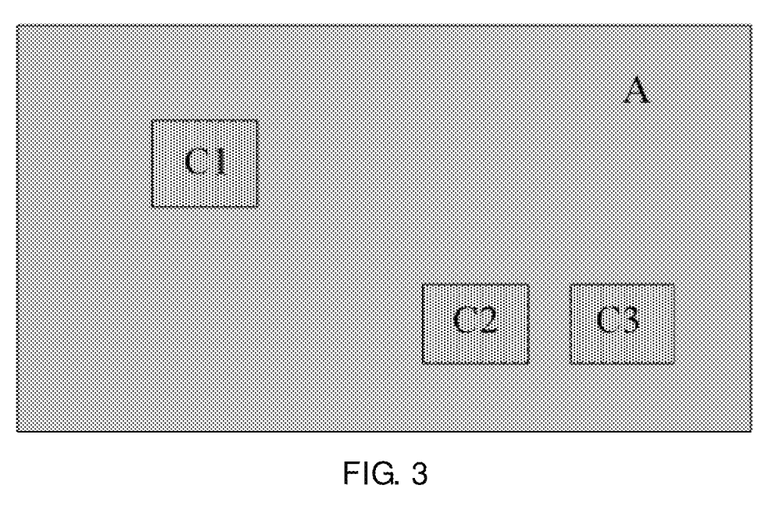
FIG. 3 is a schematic diagram of a flat circuit structure obtained after preprocessing the multilayer circuit structure shown in FIG. 2.

FIG. 3 is a schematic diagram of a flat circuit structure obtained after preprocessing the multilayer circuit structure shown in FIG. 2.

In a feasible implementation, the multilayer circuit structure shown in FIG. 2 may be processed to extract the circuit structure A and the circuit cells C1, C2, and C3 in the minimum circuit cell layer, and then the flat circuit structure shown in FIG. 3 is constructed by using a connection relationship between the circuit structure A and the circuit cells C1, C2, and C3.

S102. Determine, in a circuit layout, an area of each target circuit cell in the minimum circuit cell layer, and determine, in the circuit layout, a relative distribution location of each target circuit cell.

It can be understood that, the area of each circuit cell in the circuit schematics is usually fixed, while an area of each circuit cell in an actual circuit layout is usually determined by a type, a function, an actual structure, and the like of the circuit cell, that is, an area of a circuit cell in a circuit schematics may be different from that of the same circuit cell in a circuit layout.

In this embodiment of the present application, after each target circuit cell in the minimum circuit cell layer is determined, the area of each target circuit cell in the actual circuit layout may be determined according to the type, the function, the actual structure, and the like of each target circuit cell.

In addition, it can be further understood that, a relative distribution location of each circuit cell in the circuit schematics is usually determined by a designer, for easy connection and easy understanding of a circuit principle, while in an actual circuit layout, a relative distribution location of each circuit cell needs to comply with a preset location distribution rule, for optimization of circuit performance, that is, a location of a circuit cell in the circuit schematics may be different from that of the same circuit cell in the circuit layout.

In this embodiment of the present application, after the top-layer structure and the minimum circuit cell layer of the circuit schematics are determined, a location distribution rule corresponding to the circuit schematics may be obtained, and the relative distribution location of each target circuit cell in the circuit layout may be determined according to the location distribution rule.

S103. Generate a first circuit structure based on the top-layer structure, each target circuit cell, and the area and the relative distribution location of each target circuit cell in the circuit layout.

In a feasible implementation, in the flat circuit structure shown in FIG. 3, an area of each target circuit cell in the foregoing flat circuit structure may be adjusted based on the area of each target circuit cell in the circuit layout; and a relative distribution location of each target circuit cell in the flat circuit structure may be adjusted based on the relative distribution location of each target circuit cell in the circuit layout, and the adjusted flat circuit structure may be used as the first circuit structure.

An area of each target circuit cell in the first circuit structure is the same as or proportional to the area of each target circuit cell in the circuit layout. A relative distribution location of each target circuit cell in the first circuit structure is the same as the relative distribution location of each target circuit cell in the circuit layout.

Figure 4:
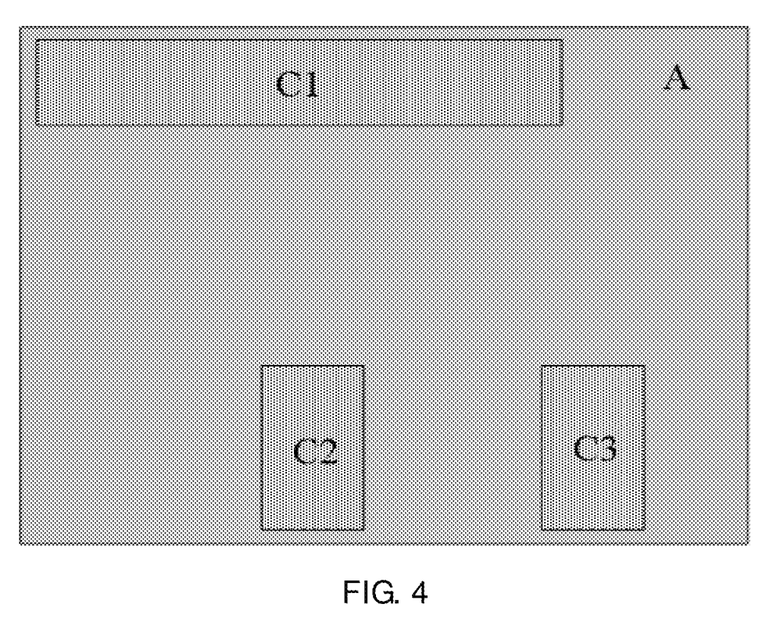
FIG. 4 is a schematic diagram of a first circuit structure according to an embodiment of the present application.

For better understanding of this embodiment of the present application, refer to FIG. 4. FIG. 4 is a schematic diagram of a first circuit structure according to an embodiment of the present application.

In this embodiment of the present application, areas of the circuit cells C1, C2, and C3 in the foregoing flat circuit structure may be adjusted based on areas of the circuit cells C1, C2, and C3 in the circuit layout; and relative distribution locations of the circuit cells C1, C2, and C3 in the foregoing flat circuit structure may be adjusted based on relative distribution locations of the circuit cells C1, C2, and C3 in the circuit layout, to obtain the first circuit structure shown in FIG. 4.

It can be understood that, the first circuit structure generated in step S103 can be the same as or similar to a structure of an actual circuit layout.

S104. Add a parasitic effect circuit to the first circuit structure, generate a target circuit structure corresponding to the circuit schematics, and perform simulation based on the target circuit structure.

In this embodiment of the present application, the parasitic effect circuit may be added to the first circuit structure after the first circuit structure is generated, to simulate a parasitic effect between the target circuit cells.

After the target circuit structure is generated, a simulation result of the simulation performed based on the target circuit structure may be used as a pre-layout simulation result of the circuit schematics.

According to the circuit simulation method provided in this embodiment of the present application, a circuit symbol area and a relative distribution location of each target circuit cell in a generated first circuit structure are the same as or similar to those in an actual circuit layout. Therefore, adding a parasitic effect circuit to the first circuit structure can more accurately simulate a parasitic effect between target circuit cells, thereby effectively improving pre-layout simulation accuracy of a circuit.

Figure 5:
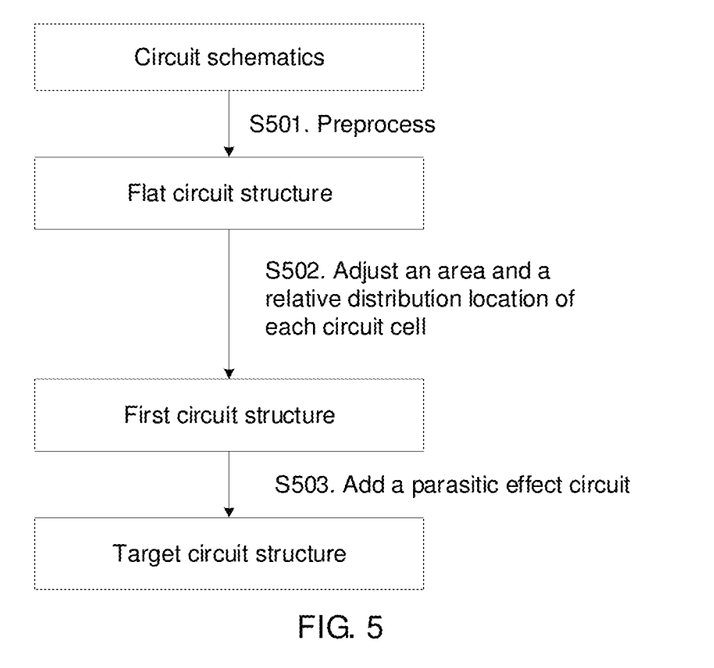
FIG. 5 is another schematic flowchart of a circuit simulation method according to an embodiment of the present application.

Based on the content described in the foregoing embodiment, in a feasible implementation of the present application, referring to FIG. 5, FIG. 5 is another schematic flowchart of a circuit simulation method according to an embodiment of the present application. In a feasible implementation, the method includes:

S501. Preprocess a circuit schematics to obtain a flat circuit structure. In this embodiment of the present application, the flat circuit structure may be obtained based on each circuit cell in a top-layer structure and a minimum circuit cell layer of the circuit schematics.

S502. Adjust an area and a relative distribution location of each circuit cell in the flat circuit structure to obtain a first circuit structure.

In this embodiment of the present application, an area and a relative distribution location of each circuit cell in the minimum circuit cell layer in a circuit layout are predetermined.

Optionally, the area of each circuit cell in the minimum circuit cell layer in the circuit layout may be determined in the following manner:

Step a: Traverse each target circuit cell, and determine whether each traversed target circuit cell is a standard circuit cell; and if a currently traversed target circuit cell is a standard circuit cell, proceed to step b; otherwise, perform step c.

Step b: Determine an area of the currently traversed target circuit cell based on a layout size corresponding to the target circuit cell in a standard circuit cell library.

It can be understood that, because an area of a standard circuit cell in the circuit layout is fixed, if the currently traversed target circuit cell is a standard circuit cell, the layout area corresponding to the target circuit cell in the standard circuit cell library may be determined as an area of the currently traversed target circuit cell.

Step c: Determine an area of the currently traversed target circuit cell based on standard components used by the currently traversed target circuit cell.

In a feasible implementation, a layout area of each standard component used by the currently traversed target circuit cell may be determined first, and then a sum of the layout areas of the standard components is determined as the area of the currently traversed target circuit cell.

It can be understood that, when decomposed to the underlying layer, any circuit cell consists of a digital standard (STD) cell and a transistor (an analog circuit part). Therefore, in this embodiment, total quantities of digital standard cells and transistors used in the currently traversed target circuit cell can be determined by using an automated script or manual check method. A layout area of a single digital standard cell and a layout area of a single transistor are fixed, and can be directly determined in a layout. Therefore, after the quantity and types of standard components used by the currently traversed target circuit cell are determined, the areas of the standard components are added to obtain the area of the currently traversed target circuit cell.

In another feasible implementation, after the standard components used by the currently traversed target circuit cell are determined, an area of each standard component may alternatively be calculated by measuring a length and a width of each standard component in the layout, and then the areas of the standard components are added to obtain the area of the currently traversed target circuit cell.

For example, it is assumed that three A-type components and two B-type components are used by the currently traversed target circuit cell. It can be obtained through measurement that the A-type component has a length of $L_A$ and a width of $H_A$, and the B-type component has a length of $L_B$ and a width of $H_B$. In this case, it may be determined that the area S of the currently traversed target circuit cell is:

$$S=3L_A*H_A+2L_B*H_B$$

In this embodiment of the present application, a circuit symbol corresponding to each target circuit cell may be first generated according to an area of each target circuit cell in a circuit layout. A size of the circuit symbol corresponding to each target circuit cell is in direct proportion to the area of each target circuit cell in the circuit layout. In addition, the first circuit structure is generated based on the circuit symbol corresponding to each target circuit cell and the relative distribution location of each target circuit cell in the circuit layout. A relative distribution location of the circuit symbol corresponding to each target circuit cell in the first circuit structure is the same as the relative distribution location of each target circuit cell in the circuit layout. In this way, the first circuit structure can be the same as or similar to a structure of an actual circuit layout.

S503. Add a parasitic effect circuit to the first circuit structure to obtain a target circuit structure.

In a feasible implementation, during adding of the parasitic effect circuit to the first circuit structure, a parasitic parameter of each parasitic element in the parasitic effect circuit may be determined based on a pin location of each circuit symbol in the first circuit structure; and the parasitic effect circuit may be added to the first circuit structure based on the parasitic parameter of each parasitic element in the parasitic effect circuit.

In this embodiment, a length of a metal trace of each parasitic element may be determined based on a pin location of each circuit symbol in the first circuit structure, and then the parasitic parameter of each parasitic element in the parasitic effect circuit may be determined based on the length of the metal trace of each parasitic element, a preset width of the metal trace, and a sheet resistance and a unit area parasitic capacitance of the metal trace.

Optionally, the parasitic effect circuit is of a network topology structure. In a feasible implementation, the foregoing parasitic effect circuit may be a fishbone topology network parasitic model circuit.

Figure 6:
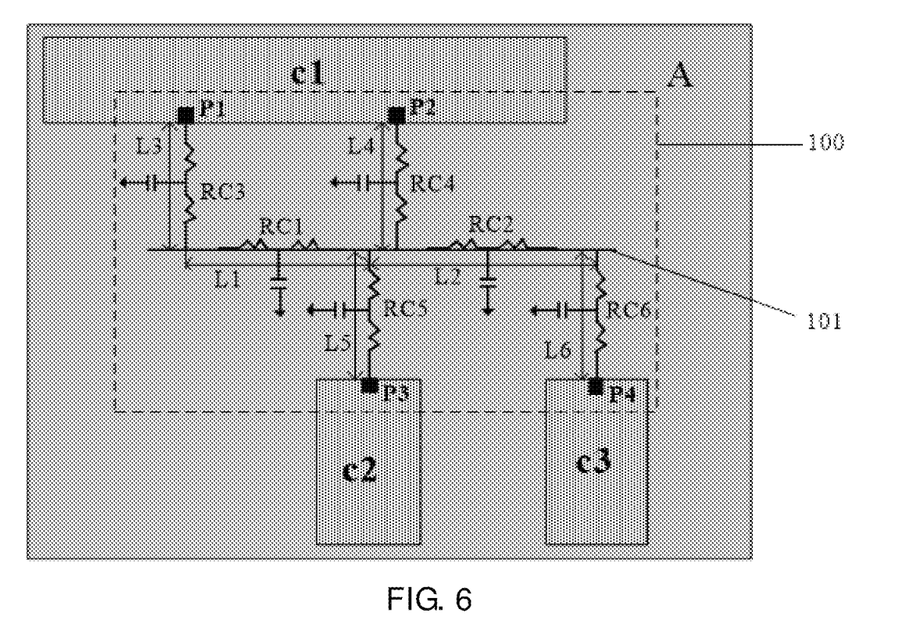
FIG. 6 is a schematic diagram of a target circuit structure according to an embodiment of the present application.

For better understanding of this embodiment of the present application, refer to FIG. 6. FIG. 6 is a schematic diagram of a target circuit structure according to an embodiment of the present application.

In this embodiment, it is assumed that a circuit symbol c1 includes pins P1 and P2, a circuit symbol c2 includes a pin P3, and a circuit symbol c3 includes a pin P4. A location of a central axis 101 in a parasitic effect circuit 100A is determined with a horizontal direction as an X-axis and a vertical direction as a Y-axis. A longitudinal coordinate Ymid of the central axis may be determined in the following manner:

$$Ymid=0.5*(Ymax+Ymin)$$

wherein Ymax is a maximum value of longitudinal coordinates of the pins P1, P2, P3, and P4, and Ymin is a minimum value of longitudinal coordinates of the pins P1, P2, P3, and P4.

L1, L2, L3, L4, L5, and L6 are used to respectively represent lengths of metal traces of parasitic elements RC1, RC2, RC3, RC4, RC5, and RC6.

In a feasible implementation, values of L1, L2, L3, L4, L5, and L6 may be determined respectively based on a central axis and coordinates of the pins P1, P2, P3, and P4. Details are as follows:

$$L1=X_{P3}-X_{P1}$$

$$L2=X_{P4}-X_{P3}$$

$$L3=Y_{P1}-Ymid$$

$$L4=Y_{P2}-Ymid$$

$$L5=Ymid-Y_{P3}$$

$$L6=Ymid-Y_{P4}$$

wherein $X_{P1}$ represents a horizontal coordinate of the pin P1, $X_{P3}$ represents a horizontal coordinate of the pin P3, and $X_{P4}$ represents a horizontal coordinate of the pin P4; and $Y_{P1}$ represents a longitudinal coordinate of the pin P1, $Y_{P2}$ represents a longitudinal coordinate of the pin P2, $Y_{P3}$ represents a longitudinal coordinate of the pin P3, and $Y_{P4}$ represents a longitudinal coordinate of the pin P4.

It can be understood that an actual layout includes a plurality of metal layers. In a feasible implementation of the present application, minimum widths corresponding to different metal layers may be predetermined according to a process design rule and a circuit layout rule.

In some implementations, a metal trace of a parasitic element may use different metal layers in different directions, for example, may use different metal layers in the X-axis direction and the Y-axis direction.

A width of the metal trace of each parasitic element may be determined according to a minimum width of a metal layer used by the metal trace and a circuit layout design requirement. A sheet resistance $R_{sh}$ and a unit area parasitic capacitance $C_{unit}$ of a metal trace at a different metal layer may be determined according to the process design rule.

In a feasible implementation, parasitic parameters of each parasitic element include a parasitic resistance and a parasitic capacitance. The parasitic resistance R may be calculated in the following manner:

$$R=R_{sh}*L/W$$

The parasitic capacitance C may be calculated in the following manner:

$$C=C_{unit}*W*L$$

L represents a length of a metal trace of a parasitic element, and W represents a width of the metal trace.

According to the circuit simulation method provided in this embodiment of the present application, a circuit symbol area and a relative distribution location of each target circuit cell in a generated first circuit structure are the same as or similar to those in an actual circuit layout. Therefore, adding a parasitic effect circuit to the first circuit structure can more accurately simulate a parasitic effect between target circuit cells, thereby effectively improving pre-layout simulation accuracy of a circuit.

Figure 7:
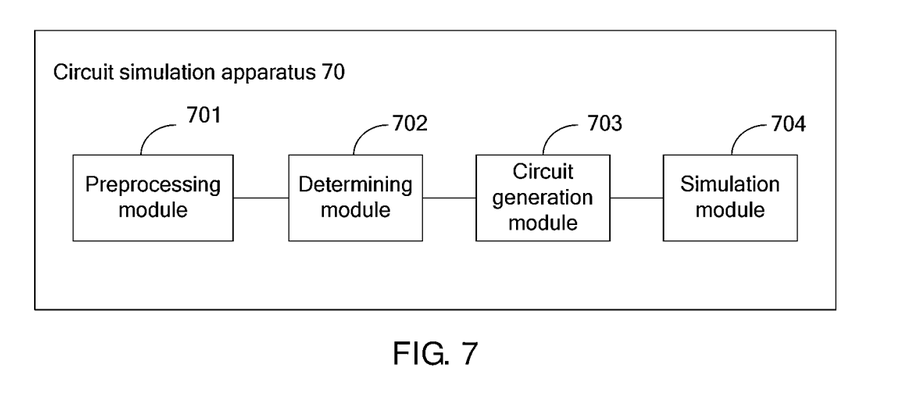
FIG. 7 is a schematic diagram of a program module of a circuit simulation apparatus according to an embodiment of the present application.

Based on the content described in the foregoing embodiment, an embodiment of the present application further provides a circuit simulation apparatus. Referring to FIG. 7, FIG. 7 is a schematic diagram of a program module of a circuit simulation apparatus according to an embodiment of the present application. The circuit simulation apparatus 70 includes:

a preprocessing module 701, configured to determine a top-layer structure and a minimum circuit cell layer of a circuit schematics;

a determining module 702, configured to determine, in a circuit layout, an area of each target circuit cell in the minimum circuit cell layer, and determine, in the circuit layout, a relative distribution location of each target circuit cell;

a circuit generation module 703, configured to generate a first circuit structure based on the top-layer structure, each target circuit cell, and the area and the relative distribution location of each target circuit cell in the circuit layout; and a simulation module 704, configured to add a parasitic effect circuit to the first circuit structure, generate a target circuit structure corresponding to the circuit schematics, and perform simulation based on the target circuit structure.

According to the circuit simulation apparatus 70 provided in this embodiment of the present application, a circuit symbol area and a relative distribution location of each target circuit cell in a generated first circuit structure are the same as or similar to those in an actual circuit layout. Therefore, adding a parasitic effect circuit to the first circuit structure can more accurately simulate a parasitic effect between target circuit cells, thereby effectively improving pre-layout simulation accuracy of a circuit.

In a feasible implementation, the determining module 702 is configured to:

traverse each target circuit cell, and determine whether each traversed target circuit cell is a standard circuit cell; and if a currently traversed target circuit cell is a standard circuit cell, determine an area of the currently traversed target circuit cell based on a layout size corresponding to the target circuit cell in a standard circuit cell library; or if a currently traversed target circuit cell is not a standard circuit cell, determine an area of the currently traversed target circuit cell based on standard components used by the currently traversed target circuit cell.

In a feasible implementation, the determining module 702 is specifically configured to:

determine a layout area of each standard component used by the currently traversed target circuit cell; and determine a sum of the layout areas of the standard components as the area of the currently traversed target circuit cell.

In a feasible implementation, the determining module 702 is further configured to:

obtain a location distribution rule corresponding to the circuit schematics; and determine, in the circuit layout, the relative distribution location of each target circuit cell according to the location distribution rule.

In a feasible implementation, the circuit generation module 703 is configured to:

generate a circuit symbol corresponding to each target circuit cell based on the area of each target circuit cell in the circuit layout, wherein a size of the circuit symbol corresponding to each target circuit cell is in direct proportion to the area of each target circuit cell in the circuit layout; and generate the first circuit structure based on the top-layer structure, the circuit symbol corresponding to each target circuit cell, and the relative distribution location of each target circuit cell in the circuit layout, wherein a relative distribution location of the circuit symbol corresponding to each target circuit cell in the first circuit structure is the same as the relative distribution location of each target circuit cell in the circuit layout.

In a feasible implementation, the simulation module 704 is configured to:

determine a parasitic parameter of each parasitic element in the parasitic effect circuit based on a pin location of each circuit symbol in the first circuit structure; and add the parasitic effect circuit to the first circuit structure based on the parasitic parameter of each parasitic element in the parasitic effect circuit.

In a feasible implementation, the simulation module 704 is specifically configured to:

determine a length of a metal trace of each parasitic element based on the pin location of each circuit symbol in the first circuit structure; and determine the parasitic parameter of each parasitic element in the parasitic effect circuit based on the length of the metal trace of each parasitic element, a preset width of the metal trace, and a sheet resistance and a unit area parasitic capacitance of the metal trace.

In a feasible implementation, the foregoing parasitic effect circuit is of a network topology structure.

It should be noted that, for content specifically executed by the preprocessing module 701, the determining module 702, the circuit generation module 703, and the simulation module 704 in this embodiment of the present application, reference may be made to the related content in each embodiment of the foregoing circuit simulation method, and details are not described herein again.

Further, based on the content described in the foregoing embodiment, an embodiment of the present application further provides a circuit simulation apparatus. The circuit simulation apparatus includes at least one processor and a memory. The memory stores computer executable instructions. The at least one processor executes the computer executable instructions stored in the memory, to implement the steps in the circuit simulation method described in the foregoing embodiment. For details, reference may be made to the related description in the foregoing method embodiment. This is not described in detail in this embodiment.

Figure 8:
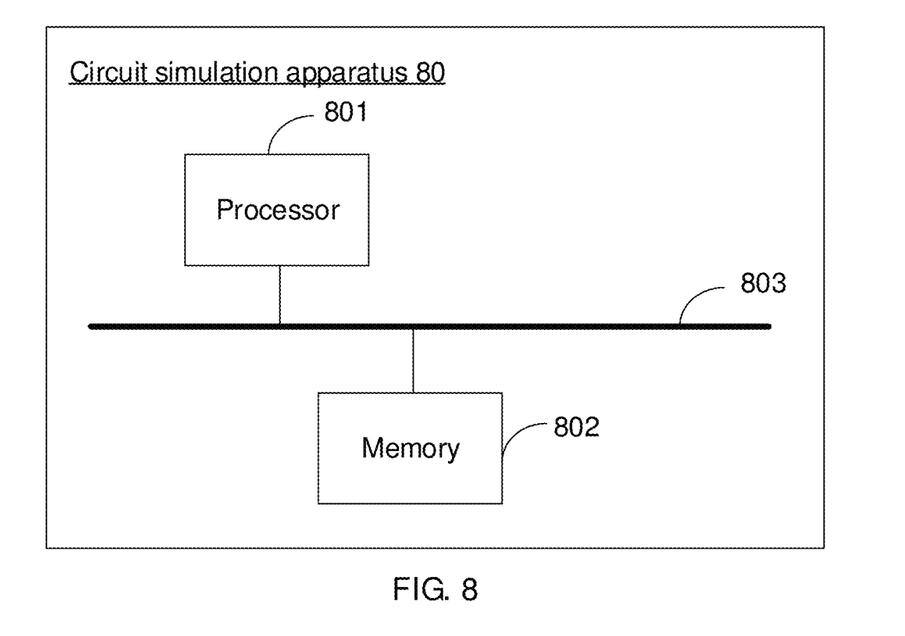
FIG. 8 is a schematic hardware structural diagram of a circuit simulation apparatus according to an embodiment of the present application.

For better understanding of this embodiment of the present application, refer to FIG. 8. FIG. 8 is a schematic hardware structural diagram of a circuit simulation apparatus according to an embodiment of the present application.

As shown in FIG. 8, the circuit simulation apparatus 80 of this embodiment includes a processor 801 and a memory 802, wherein:

the memory 802 is configured to store computer executable instructions; and the processor 801 is configured to execute the computer executable instructions stored in the memory, to implement the steps in the circuit simulation method described in the foregoing embodiment. For details, reference may be made to the related description in the foregoing method embodiment. This is not described in detail again in this embodiment.

Optionally, the memory 802 may be independent, or may be integrated with the processor 801.

When the memory 802 is independently provided, the apparatus further includes a bus 803, configured to connect the memory 802 and the processor 801.

In an exemplary embodiment, a non-transitory computer-readable storage medium including instructions is provided. Referring to FIG. 8, for example, the non-transitory computer-readable storage medium may be the memory 802 including instructions. The foregoing instructions may be executed by the processor 801 of the circuit simulation apparatus 80 to complete the foregoing method. For example, the non-transitory computer-readable storage medium may be a ROM, a RAM, a CD-ROM, a magnetic tape, a floppy disk, an optical data storage device, or the like.

Further, based on the content described in the foregoing embodiment, an embodiment of the present application further provides a computer readable storage medium. The computer readable storage medium stores computer executable instructions. When executing the computer executable instructions, a processor implements the steps in the circuit simulation method described in the foregoing embodiment. For details, reference may be made to the related description in the foregoing method embodiment. This is not described in detail again in this embodiment.

Further, based on the content described in the foregoing embodiment, an embodiment of the present application further provides a computer program product, including a computer program. When executed by a processor, the computer program can implement the steps in the circuit simulation method described in the foregoing embodiment. For details, reference may be made to the related description in the foregoing method embodiment. This is not described in detail again in this embodiment.

Persons skilled in the art should understand that the embodiments of the present disclosure may be provided as a method, an apparatus (device), or a computer program product. Therefore, the present disclosure may use a form of hardware only examples, software only examples, or examples with a combination of software and hardware. Moreover, the present disclosure may be in a form of a computer program product that is implemented on one or more computer-usable storage media that include computer-usable program code. In addition, as is well known to persons of ordinary skill in the art, the communication media usually contain computer-readable instructions, data structures, program modules, or other data in modulated data signals such as carrier waves or other transmission mechanisms, and may include any information transfer medium.

In the several embodiments provided in the present application, it should be understood that the disclosed device and method may be implemented in other manners. For example, the device embodiment described above is merely an example. For example, the module division is merely logical function division and may be other division in actual implementation. For example, a plurality of modules may be combined or integrated into another system, or some features may be ignored or may not be performed. In addition, the displayed or discussed mutual couplings or direct couplings or communication connections may be implemented through some interfaces, indirect couplings or communication connections between the apparatuses or modules, or electrical connections, mechanical connections, or connections in other forms.

The modules described as separate components may or may not be physically separated, and the components displayed as modules may or may not be physical units, and may be located in one place or may be distributed on a plurality of network units. Some or all of the modules may be selected according to actual needs to achieve the objectives of the solutions of the embodiments.

In addition, functional modules in the embodiments of the present application may be integrated into one processing unit, or each of the modules may exist alone physically, or two or more modules are integrated into one unit. The unit formed by the modules may be implemented in a form of hardware, or may be implemented in a form of hardware plus software functional units.

The integrated module implemented in the form of a software functional module may be stored in a computer readable storage medium. The software functional module is stored in a storage medium and includes several instructions to cause a computer device (which may be a personal computer, a server, a network device, or the like) or a processor to perform some of the steps of the methods described in the embodiments of the present application.

It should be understood that the foregoing processor may be a central processing unit (CPU), or may be another general-purpose processor, digital signal processor (DSP), or application-specific integrated circuit (ASIC), or the like. The general-purpose processor may be a microprocessor, any conventional processor, or the like. The steps of the method disclosed in the present application may be directly performed by a hardware processor or performed by a combination of hardware and software modules in a processor.

The memory may include a high-speed RAM, or may further include a non-volatile memory (NVM), for example, at least one magnetic disk memory, or may be a USB flash drive, a removable hard disk, a read-only memory (ROM), a magnetic disk, or an optical disc.

The bus may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, the buses in the accompanying drawings of the present application are not limited to only one bus or one type of bus.

The foregoing storage medium may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a ROM, a magnetic memory, a flash memory, a magnetic disk, or an optical disc. The storage medium may be any available medium accessible to a general-purpose or special-purpose computer.

A storage medium used as an example is coupled to the processor, such that the processor can read information from the storage medium, and can write information into the storage medium. Certainly, the storage medium may be a part of the processor. The processor and the storage medium may be located in an ASIC. Certainly, the processor and the storage medium may exist as discrete components in an electronic device or a main control device.

Those of ordinary skill in the art can understand that all or some of the steps in the foregoing method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The present disclosure is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, such that a series of operations and steps are performed on the computer or the another programmable device, thereby generating computer-implemented processing. Therefore, the instructions executed on the computer or the another programmable device provide steps for implementing a function specified in one or more processes in the flowcharts and/or in one or more blocks in the block diagrams.

Finally, it should be noted that the above embodiments are merely used to explain the technical solutions of the present application, but are not intended to limit the present application. Although the present application is described in detail with reference to the foregoing embodiments, those of ordinary skill in the art should understand that they can still modify the technical solutions described in the foregoing embodiments, or make equivalent substitutions on some or all technical features therein. These modifications or substitutions do not make the essence of the corresponding technical solutions deviate from the spirit and scope of the technical solutions of the embodiments of the present application.

The invention claimed is:

1. A circuit simulation method, comprising:
   determining a top-layer structure and a minimum circuit cell layer of a circuit schematic, wherein the minimum circuit cell layer comprises at least one target circuit cell;
   determining, in a circuit layout, an area of each of the at least one target circuit cell in the minimum circuit cell layer, and determining, in the circuit layout, a relative distribution location of each of the at least one target circuit cell;
   generating a first circuit structure based on the top-layer structure, each of the at least one target circuit cell, and the area and the relative distribution location of each of the at least one target circuit cell in the circuit layout; and
   adding a parasitic effect circuit to the first circuit structure, generating a target circuit structure corresponding to the circuit schematic, and performing simulation based on the target circuit structure;
   wherein the generating a first circuit structure based on the top-layer structure, each of the at least one target circuit cell, and the area and the relative distribution location of each of the at least one target circuit cell in the circuit layout comprises:
      adjusting the area of each of the at least one target circuit cell in the first circuit structure based on the area of each of the at least one target circuit cell in the circuit layout; and
      adjusting the relative distribution location of each of the at least one target circuit cell in the first circuit structure based on the relative distribution location of each of the at least one target circuit cell in the circuit layout; wherein the area of each of the at least one target circuit cell in the first circuit structure is the same as or proportional to the area of each of the at least one target circuit cell in the circuit layout, and the relative distribution location of each of the at least one target circuit cell in the first circuit structure is the same as the relative distribution location of each of the at least one target circuit cell in the circuit layout.

2. The method according to claim 1, wherein the determining, in a circuit layout, an area of each of the at least one target circuit cell in the minimum circuit cell layer comprises:
   traversing each of the at least one target circuit cell, and determining whether each of the at least one target circuit cell is a standard circuit cell;
   when a currently traversed target circuit cell of the at least one target circuit cell is the standard circuit cell, determining an area of the currently traversed target circuit cell based on a layout size corresponding to the at least one target circuit cell in a standard circuit cell library; and
   when the currently traversed target circuit cell is not the standard circuit cell, determining the area of the currently traversed target circuit cell based on standard components used by the currently traversed target circuit cell.

3. The method according to claim 2, wherein the determining the area of the currently traversed target circuit cell based on standard components used by the currently traversed target circuit cell comprises:
   determining a layout area of each of the standard components used by the currently traversed target circuit cell; and
   determining a sum of the layout areas of the standard components as the area of the currently traversed target circuit cell.

4. The method according to claim 1, wherein the determining, in the circuit layout, a relative distribution location of each of the at least one target circuit cell comprises:
   obtaining a location distribution rule corresponding to the circuit schematic; and
   determining, in the circuit layout, the relative distribution location of each of the at least one target circuit cell according to the location distribution rule.

5. The method according to claim 1, wherein the generating a first circuit structure based on the top-layer structure, each of the at least one target circuit cell, and the area and the relative distribution location of each of the at least one target circuit cell in the circuit layout comprises:
   generating a circuit symbol corresponding to each of the at least one target circuit cell based on the area of each of the at least one target circuit cell in the circuit layout, wherein a size of the circuit symbol corresponding to each of the at least one target circuit cell is in direct proportion to the area of each of the at least one target circuit cell in the circuit layout; and
   generating the first circuit structure based on the top-layer structure, the circuit symbol corresponding to each of the at least one target circuit cell, and the relative distribution location of each of the at least one target circuit cell in the circuit layout, wherein a relative distribution location of the circuit symbol corresponding to each of the at least one target circuit cell in the first circuit structure is the same as the relative distribution location of each of the at least one target circuit cell in the circuit layout.

6. The method according to claim 5, wherein the adding a parasitic effect circuit to the first circuit structure comprises:

determining a parasitic parameter of each parasitic element in the parasitic effect circuit based on a pin location of each of the circuit symbols in the first circuit structure; and adding the parasitic effect circuit to the first circuit structure based on the parasitic parameter of each of the parasitic elements in the parasitic effect circuit.

7. The method according to claim 6, wherein the determining a parasitic parameter of each parasitic element in the parasitic effect circuit based on a pin location of each of the circuit symbols in the first circuit structure comprises:

determining a length of a metal trace of each of the parasitic elements based on the pin location of each of the circuit symbols in the first circuit structure; and determining the parasitic parameter of each of the parasitic elements in the parasitic effect circuit based on the length of the metal trace of each of the parasitic elements, a preset width of the metal trace, and a sheet resistance and a unit area parasitic capacitance of the metal trace.

8. The method according to claim 7, wherein the parasitic effect circuit is of a network topology structure.

9. A circuit simulation apparatus, comprising at least one processor and a memory, wherein the memory stores computer executable instructions; and the at least one processor executes the computer executable instructions stored in the memory, such that the at least one processor performs:

determining a top-layer structure and a minimum circuit cell layer of a circuit schematic, wherein the minimum circuit cell layer comprises at least one target circuit cell;

determining, in a circuit layout, an area of each of the at least one target circuit cell in the minimum circuit cell layer, and determining, in the circuit layout, a relative distribution location of each of the at least one target circuit cell;

generating a first circuit structure based on the top-layer structure, each of the at least one target circuit cell, and the area and the relative distribution location of each of the at least one target circuit cell in the circuit layout; and adding a parasitic effect circuit to the first circuit structure, generating a target circuit structure corresponding to the circuit schematic, and performing simulation based on the target circuit structure;

wherein the generating a first circuit structure based on the top-layer structure, each of the at least one target circuit cell, and the area and the relative distribution location of each of the at least one target circuit cell in the circuit layout comprises:

adjusting the area of each of the at least one target circuit cell in the first circuit structure based on the area of each of the at least one target circuit cell in the circuit layout; and adjusting the relative distribution location of each of the at least one target circuit cell in the first circuit structure based on the relative distribution location of each of the at least one target circuit cell in the circuit layout; wherein the area of each of the at least one target circuit cell in the first circuit structure is the same as or proportional to the area of each of the at least one target circuit cell in the circuit layout, and the relative distribution location of each of the at least one target circuit cell in the first circuit structure is the same as the relative distribution location of each of the at least one target circuit cell in the circuit layout.

10. The circuit simulation apparatus according to claim 9, wherein the at least one processor executes the computer executable instructions stored in the memory, such that the at least one processor performs:

traversing each of the at least one target circuit cell, and determining whether each of the at least one target circuit cell is a standard circuit cell;

when a currently traversed target circuit cell of the at least one target circuit cell is the standard circuit cell, determining an area of the currently traversed target circuit cell based on a layout size corresponding to the at least one target circuit cell in a standard circuit cell library; and when the currently traversed target circuit cell is not the standard circuit cell, determining the area of the currently traversed target circuit cell based on standard components used by the currently traversed target circuit cell.

11. The circuit simulation apparatus according to claim 10, wherein the at least one processor executes the computer executable instructions stored in the memory, such that the at least one processor performs:

determining a layout area of each of the standard components used by the currently traversed target circuit cell; and determining a sum of the layout areas of the standard components as the area of the currently traversed target circuit cell.

12. The circuit simulation apparatus according to claim 9, wherein the at least one processor executes the computer executable instructions stored in the memory, such that the at least one processor performs:

obtaining a location distribution rule corresponding to the circuit schematic; and determining, in the circuit layout, the relative distribution location of each of the at least one target circuit cell according to the location distribution rule.

13. The circuit simulation apparatus according to claim 9, wherein the at least one processor executes the computer executable instructions stored in the memory, such that the at least one processor performs:

generating a circuit symbol corresponding to each of the at least one target circuit cell based on the area of each of the at least one target circuit cell in the circuit layout, wherein a size of the circuit symbol corresponding to each of the at least one target circuit cell is in direct proportion to the area of each of the at least one target circuit cell in the circuit layout; and generating the first circuit structure based on the top-layer structure, the circuit symbol corresponding to each of the at least one target circuit cell, and the relative distribution location of each of the at least one target circuit cell in the circuit layout, wherein a relative distribution location of the circuit symbol corresponding to each of the at least one target circuit cell in the first circuit structure is the same as the relative distribution location of each of the at least one target circuit cell in the circuit layout.

14. The circuit simulation apparatus according to claim 13, wherein the at least one processor executes the computer executable instructions stored in the memory, such that the at least one processor performs:

determining a parasitic parameter of each parasitic element in the parasitic effect circuit based on a pin location of each of the circuit symbols in the first circuit structure; and adding the parasitic effect circuit to the first circuit structure based on the parasitic parameter of each of the parasitic elements in the parasitic effect circuit.

15. The circuit simulation apparatus according to claim 14, wherein the at least one processor executes the computer executable instructions stored in the memory, such that the at least one processor performs:

determining a length of a metal trace of each of the parasitic elements based on the pin location of each of the circuit symbols in the first circuit structure; and determining the parasitic parameter of each of the parasitic elements in the parasitic effect circuit based on the length of the metal trace of each of the parasitic elements, a preset width of the metal trace, and a sheet resistance and a unit area parasitic capacitance of the metal trace.

16. The circuit simulation apparatus according to claim 15, wherein the parasitic effect circuit is of a network topology structure.

17. A non-transitory computer readable storage medium, wherein the non-transitory computer readable storage medium stores computer executable instructions, and when executing the computer executable instructions, a processor implements the circuit simulation method according to claim 1.

18. A computer program product, comprising a computer program, wherein when executed by a processor, the computer program implements the circuit simulation method according to claim 1.

* * * * *